US012625279B2

(12) United States Patent
Xu et al.

(10) Patent No.: US 12,625,279 B2
(45) Date of Patent: May 12, 2026

(54) BEIDOU SATELLITE-BASED INITIAL TRAIN POSITIONING CALCULATION METHOD AND POSITIONING SYSTEM

(71) Applicant: CASCO SIGNAL LTD., Shanghai (CN)

(72) Inventors: Xianliang Xu, Shanghai (CN); Ziwei Li, Shanghai (CN); Yazhong Zhang, Shanghai (CN); Fengwei Yang, Shanghai (CN); Hongfei An, Shanghai (CN); Wen Yang, Shanghai (CN); Dening Cao, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 35 days.

(21) Appl. No.: 18/835,329

(22) PCT Filed: Nov. 10, 2022

(86) PCT No.: PCT/CN2022/131080
§ 371 (c)(1),
(2) Date: Aug. 1, 2024

(87) PCT Pub. No.: WO2023/231302
PCT Pub. Date: Dec. 7, 2023

(65) Prior Publication Data
US 2025/0130336 A1 Apr. 24, 2025

(30) Foreign Application Priority Data
May 30, 2022 (CN) .......................... 202210600655.7

(51) Int. Cl.
*G01S 19/42* (2010.01)
*G01S 19/02* (2010.01)
*G01S 19/14* (2010.01)

(52) U.S. Cl.
CPC .............. *G01S 19/42* (2013.01); *G01S 19/02* (2013.01); *G01S 19/14* (2013.01)

(58) Field of Classification Search
CPC .......... G01S 19/02; G01S 19/14; G01S 19/01; G01S 19/13; B61L 25/02; B61L 27/40;
(Continued)

(56) References Cited

U.S. PATENT DOCUMENTS

2002/0010531 A1* 1/2002 Hawthorne ......... B61L 15/0081
701/19
2010/0312461 A1 12/2010 Haynie et al.
(Continued)

FOREIGN PATENT DOCUMENTS

CN 102420921 A 4/2012
CN 102795248 A 11/2012
(Continued)

*Primary Examiner* — Sisay Yacob
(74) *Attorney, Agent, or Firm* — Sheppard Mullin Richter & Hampton LLP

(57) ABSTRACT

The present disclosure provides a Beidou satellite-based initial train positioning calculation method, and a positioning system. The initial train positioning calculation method includes the following operations: S1: receiving Beidou satellite signals to obtain Beidou navigation data, and verifying the validity of the data; S2: obtaining a track electronic map file, and verifying the validity of the file; S3: based on the Beidou navigation data and the track electronic map file, screening out possible track sections of the current position of the train as candidate track sections, and putting the candidate track sections into a set TrackList; S4: determining whether the number of the candidate track sections in the TrackList is 1; and S5: according to the determination result, selecting to execute a single track position comparison algorithm or a non-single track position comparison algorithm.

16 Claims, 4 Drawing Sheets

(58) Field of Classification Search
    CPC .. B61L 15/00; B61L 15/0018; B61L 15/0027;
                B61L 15/0072; B61L 25/025; B61L
                25/028; B61L 27/04; B61L 2205/00;
                B61L 2205/04; Y02D 30/70
    See application file for complete search history.

(56)                References Cited

U.S. PATENT DOCUMENTS

| | | | | |
|---|---|---|---|---|
| 2017/0291620 A1* | 10/2017 | Plant | .......................... | B61L 1/185 |
| 2018/0244292 A1* | 8/2018 | Bailey | ...................... | B61L 23/06 |
| 2022/0135096 A1 | 5/2022 | Revol | | |

FOREIGN PATENT DOCUMENTS

| | | | |
|---|---|---|---|
| CN | 110579780 A | 12/2019 |
| CN | 110901705 A | 3/2020 |
| CN | 111016974 A | 4/2020 |
| CN | 113428190 A | 9/2021 |
| CN | 113581260 A | 11/2021 |
| CN | 113771916 A | 12/2021 |
| CN | 113970769 A | 1/2022 |
| CN | 114044027 A | 2/2022 |
| CN | 114475722 A | 5/2022 |
| CN | 115009329 A | 9/2022 |
| JP | 2004-168216 A | 6/2004 |
| RU | 2361766 C1 | 7/2009 |

* cited by examiner

BEIDOU SATELLITE-BASED INITIAL TRAIN POSITIONING CALCULATION METHOD AND POSITIONING SYSTEM

CROSS-REFERENCE TO RELATED APPLICATIONS

This application is a National Stage of International Application No. PCT/CN2022/131080 filed on Nov. 10, 2022, which claims priority to Chinese Patent Application No. 202210600655.7 filed on May 30, 2022. Both of the aforementioned applications are hereby incorporated by reference in their entireties.

TECHNICAL FIELD

The present disclosure relates to the field of train positioning, and in particular to a Beidou satellite-based initial train positioning calculation method, and a positioning system.

BACKGROUND

Train positioning is a key technology of a train operation control system. High-precision train position information and accurate track occupancy information are crucial to the safe operation of trains in an interval and the crossing, intersection or shunting operation in a station. As the basis of the reliable operation of the train, rapidly confirming the position of the train will greatly improve the operation efficiency of railways, which is of great significance in calculating the moving direction of the train and applying resources. At present, the initial train position is widely confirmed by the position of a transponder that the train passes through, but this method requires a large number of ground devices, which brings the problems of high construction cost and difficult maintenance and also limits the operation efficiency of the train.

A satellite positioning technology has received widespread attention and application due to the real-time, high-precision and all-weather characteristics. In particular, in 2020, the Beidou 3 satellite was networked successfully. The Beidou navigation system independently developed by China further expands the service range and already has the positioning precision comparable to that of the GPS navigation system. With the differential positioning system, the positioning error can be shortened to below a meter level, and the ability of being applied to train positioning can be fully achieved. The Beidou satellite navigation is applied to the field of train positioning, so that the initial position can be calculated in the case of not moving the train after starting, the advantages of low cost and high autonomy can be greatly exerted, and the carrying efficiency of the train can be improved.

SUMMARY

An objective of the present disclosure is to provide a Beidou satellite-based initial train positioning calculation method, and a positioning system, so that the defects in the prior art can be overcome, the initial position can be calculated by utilizing the all-weather and real-time characteristics of satellite positioning in the case of not moving the train after starting, and the carrying efficiency of vehicles can be improved.

To achieve the above objective, the present disclosure is implemented by the following technical solutions:

A satellite-based initial train positioning calculation method includes the following steps:

S1: receiving Beidou satellite signals to obtain Beidou navigation data;

S2: obtaining a track electronic map file;

S3: based on the Beidou navigation data and the track electronic map file, screening out possible track sections of current positions of the train as candidate track sections, and putting each of the candidate track sections into a set TrackList;

S4: determining whether the number of the candidate track sections in the set TrackList is 1; and S5: according to the determination result, selecting to execute a single track position comparison algorithm or a non-single track position comparison algorithm.

In one embodiment, the operation S5 includes:

if the number of the candidate track sections in the set TrackList is greater than 1, executing the non-single track position comparison algorithm;

if the number of the candidate track sections in the set TrackList is equal to 1, determining, based on the track electronic map file, whether the candidate track sections have other parallel track sections;

if yes, putting each of the parallel track sections into the set TrackList, and executing the non-single track position comparison algorithm; and if not, executing the single track position comparison algorithm.

In one embodiment, the non-single track position comparison algorithm includes the following operations:

F1: performing initialization, and taking all the track sections out of the TrackList and respectively denoting same as T1, T2, . . . , Tn, a variable x=1;

F2: obtaining current Beidou navigation data, performing a map matching algorithm on the current Beidou navigation data and Tx, and according to the map matching result, generating a track-based one-dimensional train position MTLx, including a station number, a track number and a parallel track offset;

F3: determining whether MTLx is valid or not;

F4: x=x+1, determining whether x>n:

if yes, performing Operation F5, and if not, returning to Operation F2;

F5: determining whether only unique value of {MTL1, . . . , MTLn} is valid:

if not, exiting; and

F7: initializing the only valid one-dimensional train position as an initial train position, such that the initial train position is determined successfully.

In one embodiment, the one-dimensional train position MTLx further includes a vertical track offset; and Operation F3 includes:

determining whether |the vertical track offset of MTLx-|≤Threshold1, Threshold1 being a non-single track offset threshold, Threshold1>0:

if yes, MTLx is valid, and if not, MTLx is invalid.

In one embodiment, Operation F1 further includes: a valid train position counter N=0; and Operation F6 is further included between Operation F5 and Operation F7: N=N+1, determining whether N≥N1, N 1 being a non-single track valid train position counting threshold and being an integer greater than 0:

if yes, performing Operation F7, and if not, x=1, and returning Operation F2.

In one embodiment, the single track position comparison algorithm includes the following operations:

D2: obtaining current Beidou navigation data, performing a map matching algorithm on the current Beidou navigation data and the candidate track sections, and according to the map matching result, generating a track-based one-dimensional train position MTLD, comprising a station number, a track number and a parallel track offset;

D3: determining whether MTLD is valid:

if not, exiting; and

D5: initializing the MTLD as an initial train position, such that the initial train position is determined successfully.

In one embodiment, the one-dimensional train position MTLD further includes a vertical track offset; and in Operation D3, a method for determining whether the MTLD is valid is: determining whether the vertical track offset of MTLD|≤Threshold2, Threshold2 being a single track offset threshold, Threshold2>0:

In one embodiment, Operation D1 is further included before Operation D2: performing initialization, a valid train position counter N=0; and Operation D4 is further included between Operation D3 and Operation D5: N=N+1, determining whether N≥N2, N2 being a single track valid track position counting threshold and being an integer greater than 0:

if yes, performing Operation D5, and if not, performing Operation D2.

A satellite positioning system is used for implementing the Beidou satellite-based initial train positioning calculation method. The Beidou satellite positioning system includes a vehicle-mounted subsystem, where the vehicle-mounted subsystem comprises a Beidou navigation receiver; the Beidou navigation receiver is capable of receiving navigation receiver comprises a part capable of implementing the Beidou satellite-based initial train positioning calculation method; and the initial position of the train is capable of being determined by the Beidou satellite-based initial train positioning calculation method.

In one embodiment, the vehicle-mounted subsystem includes a first Beidou navigation receiver and a second Beidou navigation receiver which are mounted on the train, identical and mutually backup.

In one embodiment, the first Beidou navigation receiver and the second Beidou navigation receiver respectively perform operation to output data, the validity of the output data is determined by a comparison algorithm, and the final valid train position is obtained when the data are consistent.

In one embodiment, the Beidou satellite positioning system further includes a ground subsystem, where the ground subsystem includes a Beidou navigation receiver base station, receives a Beidou satellite signal and transmits a Beidou carrier phase differential signal to the vehicle-mounted subsystem, and is configured to assist the vehicle-mounted subsystem in performing train position differential correction to improve the train positioning precision.

In summary, compared with the prior art, the Beidou satellite-based initial train positioning calculation method, and the positioning system provided by the present disclosure have the following beneficial effects:

1. based on existing devices of a novel train control system, functions can be achieved without adding additional devices;

2. the position of the train can be determined under the static condition of the train, so that the operation efficiency of the train can be improved;

3. without depending on a track circuit and a transponder device, the device cost and the maintenance cost are saved, and the control autonomy of the train is improved.

DETAILED DESCRIPTION OF THE EMBODIMENTS

A Beidou satellite-based initial train positioning calculation method, and a positioning system provided by the present disclosure are further described below in detail with reference to the accompanying drawings and the specific embodiments. The advantages and features of the present disclosure will become clearer from the following description. It should be noted that the accompanying drawings adopt a very simplified form and all use inaccurate proportions, which are only used to assist in describing the implementation of the present disclosure conveniently and clearly and are not intended to limit the implementation conditions of the present disclosure. Therefore, it has no technical substantive significance. Any structural modification, change of a scale relationship or adjustment of size should still fall within the scope which can be covered by the technical content disclosed by the present disclosure without affecting the effects and the objective achieved by the present disclosure.

It should be noted that in this specification, relational terms such as first and second are only used to differentiate one entity or operation from another entity or operation, and do not necessarily require or imply that any actual relation or sequence exists between these entities or operations. Furthermore, the terms "comprise", "include" or any other variants thereof are intended to cover non-exclusive inclusion, so that a process, method, article or device including a series of elements not only includes elements explicitly listed, but further includes other elements not explicitly listed, or also includes elements inherent to such process, method, article or device.

Figure 1:
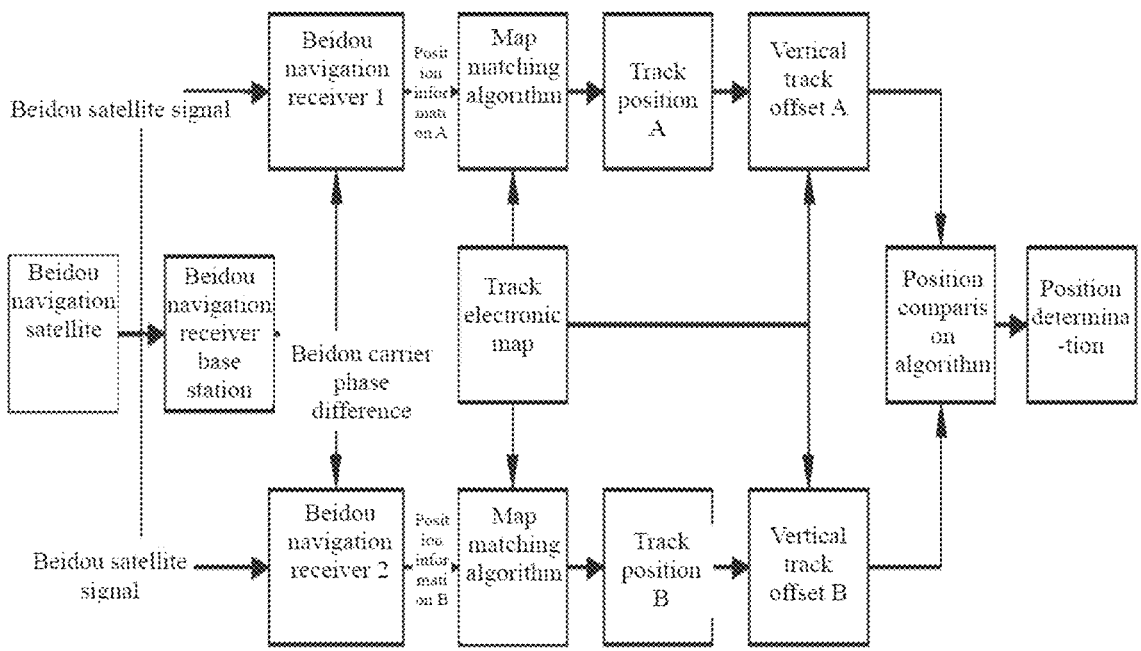
FIG. 1 is a scheme structural diagram of an initial train positioning calculation method according to an embodiment of the present disclosure.
Figure 2:
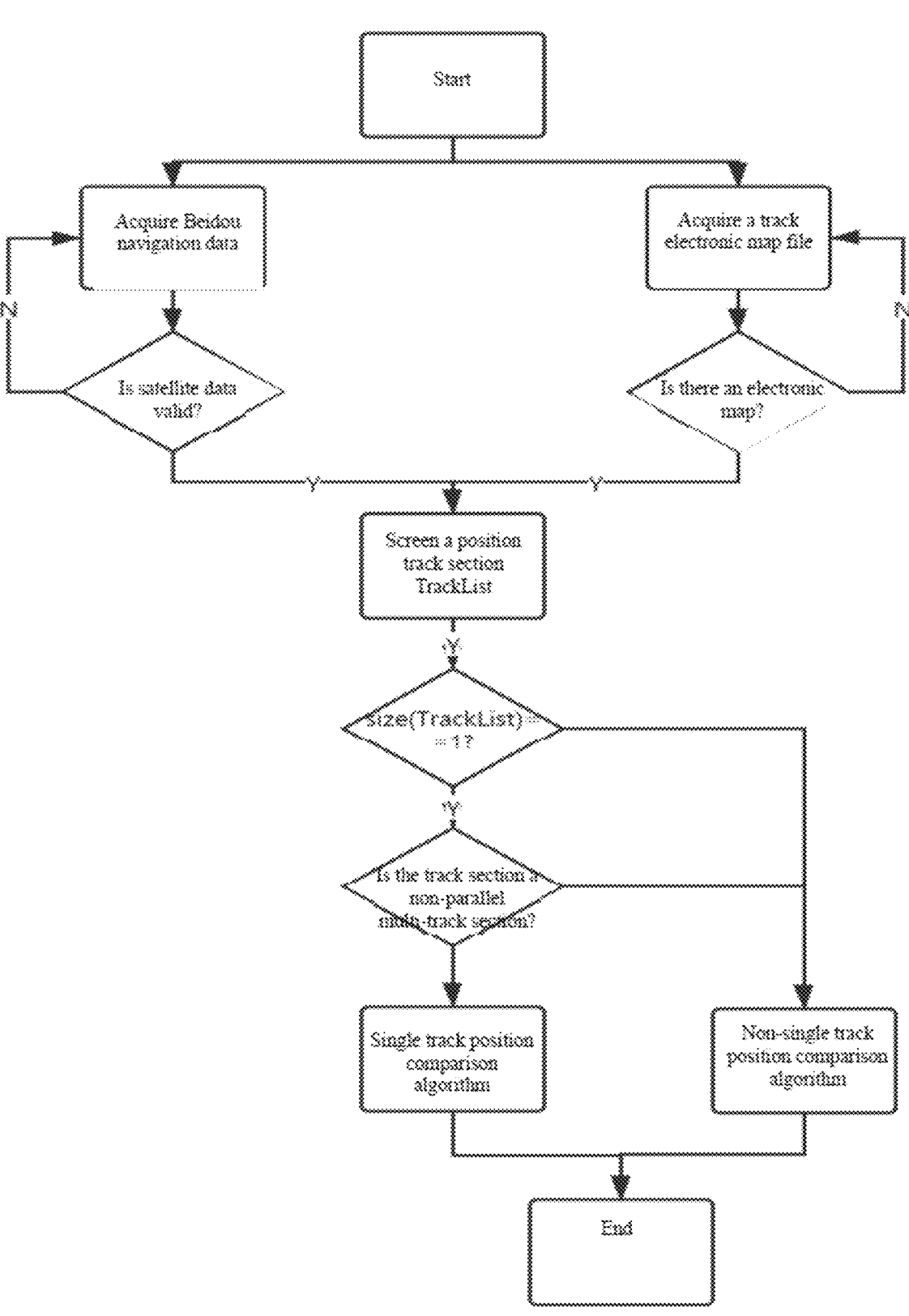
FIG. 2 is a flowchart of an initial train positioning calculation method according to an embodiment of the present disclosure.

Referring to FIG. 1 to FIG. 4, this embodiment provides a Beidou satellite-based initial train positioning calculation method, and a positioning system. As shown in FIG. 2, the calculation method includes the following operations:

Operation 1: a Beidou satellite signals are received to obtain Beidou navigation data, and the validity of the data is verified by an existing data verification method.

Operation 2: a track electronic map file is obtained, and the validity of the file is verified by the existing data verification method.

Operation 3: based on the Beidou navigation data and the track electronic map file, possible track sections of current positions of the train are screened out as candidate track sections by matching the starting and ending latitude and longitude of each track section, and each of the candidate track sections is put into a set TrackList.

Operation 4: whether the number of the candidate track sections in the set TrackList is 1 is determined, if yes, Operation S5 is performed, and if not, a non-single track position comparison algorithm is executed; and S5: whether other parallel track sections are present in the candidate track sections is determined based on the track electronic map file, if yes, each of the parallel track sections is put into the set TrackList, and the non-single track position comparison algorithm is executed, and if not, a single track position comparison algorithm is executed.

Figure 3:
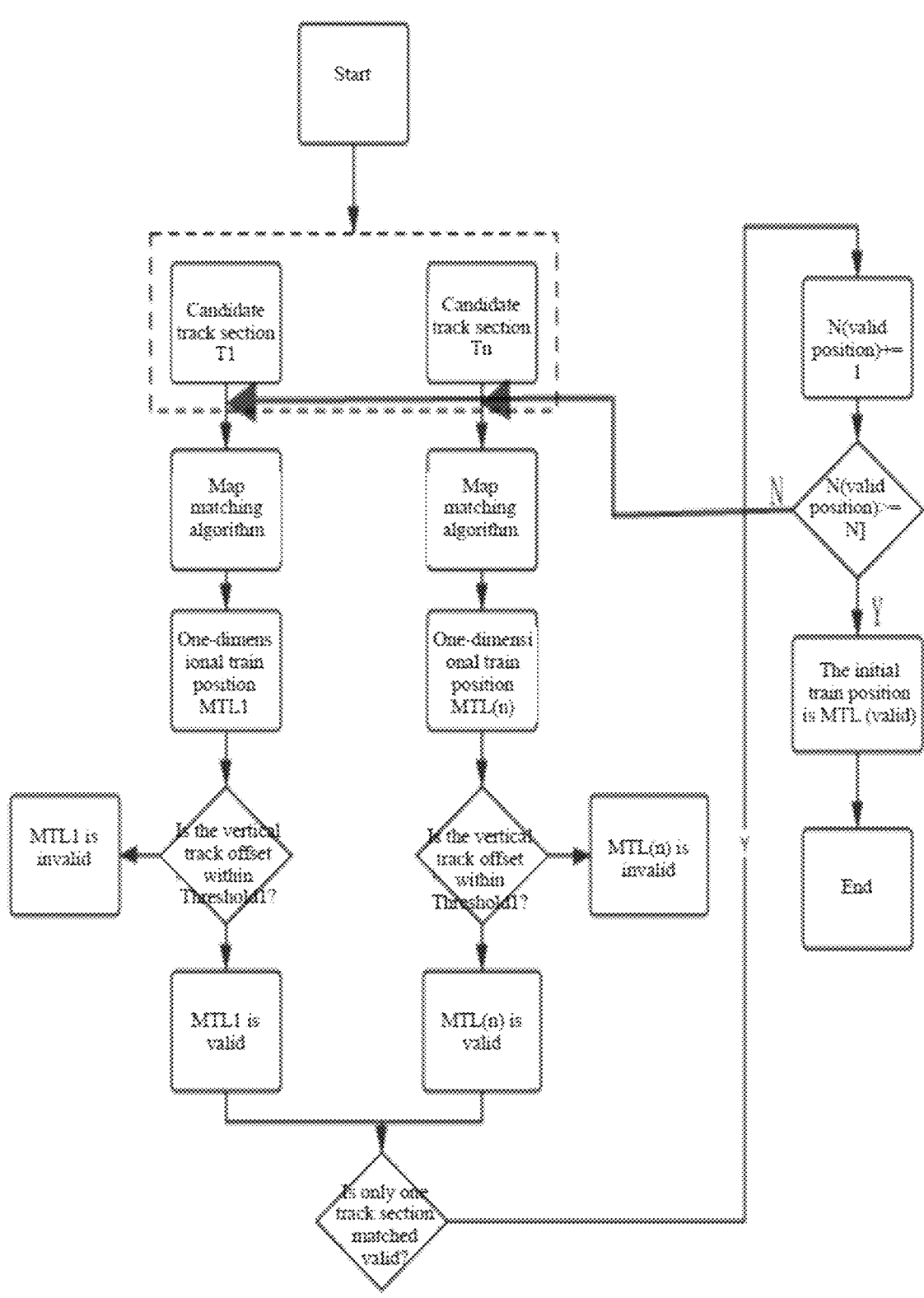
FIG. 3 is a flowchart of a non-single track position comparison algorithm according to an embodiment of the present disclosure.

The non-single track position comparison algorithm, as shown in FIG. 3, includes the following operations:

F1: initialization is performed, and all the track sections are taken out of the set TrackList and respectively denoting same as T1, T2, . . . , Tn, a valid train position counter N=0, and a variable x=1.

F2: current Beidou navigation data is obtained, a map matching algorithm is performed on the current Beidou navigation data and the candidate track sections Tx, and according to the map matching result, a track-based one-dimensional train position MTLx is generated correspondingly, including a station number, a track number, a parallel track offset and a vertical track offset, where the parallel track offset refers to an offset value of the train position at the current time projected on the track electronic map in a track line direction, and the vertical track offset refers to an offset value of the train position at the current time projected on the track electronic map in a direction vertical to the track line.

F3: whether |the vertical track offset of MTLx|≤Threshold1 is determined, where Threshold1 is a non-single track offset thread, Threshold1>0 and is an empirical value (if the vertical track offset exceeds Threshold1, it is indicated that the train position projected on the track electronic map according to the Beidou navigation data deviates from the track line greatly, and the accuracy of the Beidou navigation data is low, so the valid train position cannot be obtained):

if yes, MTLx is valid, and if not, MTLx is invalid.

F4: x=x+1, whether x>n is determined:

if yes, Operation F5 is performed, and if not, Operation F2 is returned.

F5: whether only unique valid value of {MTL1, . . . , MTLn} is valid is determined:

if yes, Operation F6 is performed, and if not, exiting is performed (if a plurality of valid values are present in {MTL1, . . . , MTLn}, it is indicated that map matching fails, no valid Beidou navigation data is in this period, the process is exited, and matching is performed again in a next period).

F6: N=N+1, whether N≥N1 is determined (where N1 is a non-single track valid train position counting threshold, is an integer greater than 0 and is an empirical value):

if yes, Operation F7 is performed (if N≥N1, it is indicated that Beidou satellite positioning in continuous N1 periods is valid, that is, the Beidou navigation data at this stage is stable and reliable, and the train position can be initialized by using the Beidou navigation data), and if not, x=1, and Operation F2 is returned.

F7: the only valid MTL is initialized as an initial train position, such that the initial train position is determined successfully.

Figure 4:
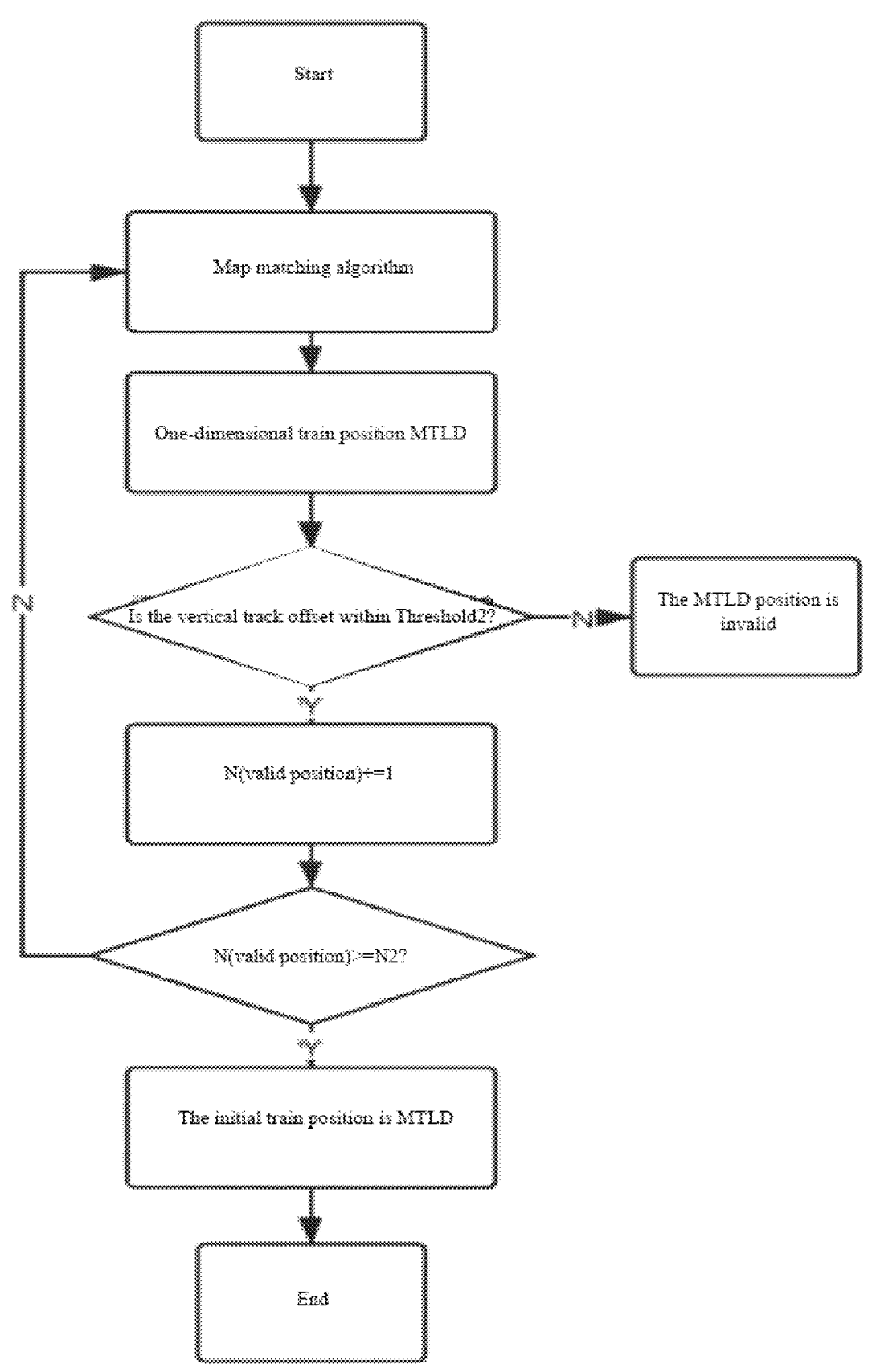
FIG. 4 is a flowchart of a single track position comparison algorithm according to an embodiment of the present disclosure.

The single track position comparison algorithm, as shown in FIG. 4, includes the following operations:

D1: initialization is initialized, a valid train position counter N=0.

D2: current Beidou navigation data is A-obtained, a map matching algorithm is performed on the current Beidou navigation data and the candidate track sections, and according to the map matching result, a track-based one-dimensional train position MTLD is generated, including a station number, a track number, a parallel track offset and a vertical track offset.

D3: whether |the vertical track offset of MTLD|≤Threshold2 is determined, where Threshold2 is a single track offset thread, Threshold2>0 and is an empirical value (if the vertical track offset exceeds Threshold2, it is indicated that the train position projected on the track electronic map according to the Beidou navigation data deviates from the track line greatly, and the accuracy of the Beidou navigation data is low, so the valid train position cannot be obtained):

if yes, MTLD is valid, and Operation D4 is performed, if not, MTLD is invalid, and exiting is performed.

D4: N=N+1, whether N≥N2 is determined (where N2 is a single track valid train position counting threshold, is an integer greater than 0 and is an empirical value):

if yes, Operation D5 is performed (if N≥N2, it is indicated that Beidou satellite positioning in continuous N2 periods is valid, that is, the Beidou navigation data at this stage is stable and reliable, and the train position can be initialized by using the Beidou navigation data), and if not, Operation D2 is returned.

D5: the MTLD is initialized as an initial train position, such that the initial train position is determined successfully.

This embodiment further provides a positioning system, for implementing the Beidou satellite-based initial train positioning calculation method. As shown in FIG. 1, the Beidou satellite positioning system includes a vehicle-mounted subsystem, where the vehicle-mounted subsystem includes a Beidou navigation receiver; the Beidou navigation receiver is capable of receiving the Beidou satellite signal and obtaining the track electronic map file; the Beidou navigation receiver further includes a part capable of implementing the Beidou satellite-based initial train positioning calculation method; and the initial position of the train is determined by the Beidou satellite-based initial train positioning calculation method. In some embodiments, the vehicle-mounted subsystem includes a Beidou navigation receiver 1 and a Beidou navigation receiver 2 which are mounted on the train, identical and mutually backup, and the system redundancy is improved. In some embodiments, the Beidou navigation receiver 1 and the Beidou navigation receiver 2 respectively perform operation to output data, the validity of the two paths of data is determined through a position comparison algorithm and by using a track position and vertical track deviation value, and the final valid train position is obtained if the data are consistent, so that the positioning accuracy is further improved. In some embodiments, the Beidou satellite positioning system further includes a ground subsystem, where the ground subsystem includes a Beidou navigation receiver base station, receives a Beidou satellite signal and transmits a Beidou carrier phase differential signal to the vehicle-mounted subsystem, and is configured to assist the vehicle-mounted subsystem in performing train position differential correction to improve the train positioning precision.

In summary, according to the Beidou satellite-based initial train positioning calculation method, and the positioning system provided by the present disclosure, based on existing devices of a novel train control system, functions can be achieved without adding additional devices; the position of the train can be determined under the static condition of the train, so that the operation efficiency of the train can be improved; and without depending on a track circuit and a transponder device, the device cost and the maintenance cost are saved, and the control autonomy of the train is improved.

Although the content of the present disclosure has been described in detail through the aforementioned preferred embodiments, it should be recognized that the above description should not be considered as limiting the present disclosure. Various modifications and alternatives to the present disclosure will become apparent to those skilled in the art upon reading the foregoing disclosure. Accordingly, the protection scope of the present disclosure shall be limited by the appended claims.

The invention claimed is:

1. A method of operating a train, comprising:

receiving satellite signals to obtain navigation data;

obtaining a track electronic map file;

based on the navigation data and the track electronic map file, selecting one or more track sections of a current position of the train as candidate track sections, and putting each of the candidate track sections into a set TrackList;

determining whether a number of the candidate track sections in the set TrackList is 1;

according to the determination result, selecting a single track position comparison algorithm or a non-single track position comparison algorithm to execute to determine an initial train position of the train; and controlling the train to operate according to the initial train position, wherein the non-single track position comparison algorithm comprises:

performing initialization, and taking out all the track sections of the TrackList and respectively denoting the track sections as T1, T2, . . . , Tn, a variable x=1;

obtaining current navigation data, performing a map matching algorithm on the current navigation data and each of the track sections T1, T2 . . . Tn, and according to the map matching result, generating a track-based one-dimensional train position MTLx comprising a station number, a track number and a parallel track offset;

determining whether the MTLx is valid or not;

determining whether {MTL1, . . . , MTLn} has only a unique valid value;

in response to {MTL1 . . . MTLn} does not have only a unique valid value, exiting; and initializing the unique valid one-dimensional train position as the initial train position, such that the initial train position is determined successfully.

2. The method according to claim 1, wherein the according to the determination result, selecting the single track position comparison algorithm or the non-single track position comparison algorithm comprises:

in response to the number of the candidate track sections in the set TrackList is greater than 1, executing the non-single track position comparison algorithm;

in response to the number of the candidate track sections in the set TrackList is equal to 1, determining, based on the track electronic map file, whether the candidate track sections have other parallel track sections;

in response to the candidate track sections have other parallel track sections, putting each of the parallel track sections into the set TrackList, and executing the non-single track position comparison algorithm; and in response to the candidate track sections do not have other parallel track, executing the single track position comparison algorithm.

3. The method according to claim 1, wherein the one-dimensional train position MTLx further comprises a vertical track offset; and wherein the determining whether the MTLx is valid or not comprises:

determining whether an absolute value of the vertical track offset of MTLx is less than or equal to Threshold1, Threshold1 being a non-single track offset threshold, Threshold1>0:

in response to the absolute value of the vertical track offset of MTLx is less than or equal to Threshold1, MTLx is valid, and in response to the absolute value of the vertical track offset of MTLx is not less than or equal to Threshold1, MTLx is invalid.

4. The method according to claim 1, further comprises: setting a valid train position counter N=0; and the non-single track position comparison algorithm further comprises: increasing the valid train position counter to be an updated valid train position counter, determining whether the updated valid train position counter is larger than or equal to N1, N 1 being a non-single track valid train position counting threshold and being an integer greater than 0:

in response to the updated valid train position counter is larger than or equal to N1, initializing the unique valid one-dimensional train position as the initial train position, and in response to the updated valid train position counter is not larger than or equal to N1, obtaining current navigation data, performing a map matching algorithm on the current navigation data and each of the track sections T1, T2 . . . , Tn, and according to the map matching result, generating a track-based one-dimensional train position MTLx comprising a station number, a track number and a parallel track offset.

5. The method according to claim 1, wherein the single track position comparison algorithm comprises:

obtaining current navigation data, performing a map matching algorithm on the current navigation data and the candidate track sections, and according to the map matching result, generating a track-based one-dimensional train position MTLD comprising a station number, a track number and a parallel track offset;

determining whether the MTLD is valid:

in response to determining whether the MTLD is valid, exiting; and initializing the MTLD as the initial train position, such that the initial train position is determined successfully.

6. The method according to claim 5, wherein the one-dimensional train position MTLD further comprises a vertical track offset; and wherein the determining whether the MTLD is valid comprises: determining whether |the vertical track offset of MTLD|≤Threshold2, Threshold2 being a single track offset threshold.

7. The method according to claim 5, further comprising:

performing initialization, setting a valid train position counter N=0; and increasing the valid train position counter to be an updated valid train position counter, determining whether the updated valid train position counter is larger than or equal to N2, N2 being a single track valid track position counting threshold and being an integer greater than 0:

in response to the updated valid train position counter is larger than or equal to N2, initializing the MTLD as the initial train position, and in response to the updated valid train position counter is not larger than or equal to N2, obtaining current navigation data, performing a map matching algorithm on the current navigation data and the candidate track sections, and according to the map matching result, generating a track-based one-dimensional train position MTLD comprising a station number, a track number and a parallel track offset.

8. A satellite positioning system, comprising:

a vehicle-mounted subsystem comprising:

a first navigation receiver being capable of receiving the satellite signal and obtain the track electronic map file;

at least one processor; and a memory coupled to the at least one processor to store instructions, which when executed by the at least one processor, cause the satellite positioning system to perform operations, the operations comprising:

based on the navigation data and the track electronic map file, selecting one or more track sections of a current position of a train as candidate track sections, and putting each of the candidate track sections into a set TrackList;

determining whether a number of the candidate track sections in the set TrackList is 1;

according to the determination result, selecting a single track position comparison algorithm or a non-single track position comparison algorithm to execute to determine an initial train position of the train; and controlling the train to operate according to the initial train position, wherein the non-single track position comparison algorithm comprises:

performing initialization, and taking out all the track sections of the TrackList and respectively denoting the track sections as T1, T2, . . . , Tn, a variable x=1;

obtaining current navigation data, performing a map matching algorithm on the current navigation data and each of the track sections T1, T2, . . . Tn, and according to the map matching result, generating a track-based one-dimensional train position MTLx comprising a station number, a track number and a parallel track offset;

determining whether the MTLx is valid or not;

determining whether {MTL1, . . . MTLn} has only a unique valid value:

in response to {MTL1, . . . MTLn} does not have only a unique valid value, exiting; and initializing the unique valid one-dimensional train position as the initial train position, such that the initial train position is determined successfully.

9. The satellite positioning system according to claim 8, further comprising:

a second navigation receiver mounted on the train, being identical and mutually backup to the first navigation receiver.

10. The satellite positioning system according to claim 9, wherein the first navigation receiver and the second navigation receiver respectively perform operation to output data, the validity of the data is determined by a comparison algorithm, and the final valid train position is obtained when the data from the first navigation receiver and the second navigation receiver are consistent.

11. The satellite positioning system according to claim 8, further comprising a ground subsystem comprising a navigation receiver base station, wherein the navigation receiver base station receives a satellite signal and transmits a carrier phase differential signal to the vehicle-mounted subsystem, and is configured to assist the vehicle-mounted subsystem in performing a train position differential correction to improve a train positioning precision.

12. The satellite positioning system according to claim 8, wherein the according to the determination result, selecting the single track position comparison algorithm or the non-single track position comparison algorithm comprises:

in response to the number of the candidate track sections in the set TrackList is greater than 1, executing the non-single track position comparison algorithm;

in response to the number of the candidate track sections in the set TrackList is equal to 1, determining, based on the track electronic map file, whether the candidate track sections have other parallel track sections;

in response to the candidate track sections have other parallel track sections, putting each of the parallel track sections into the set TrackList, and executing the non-single track position comparison algorithm; and in response to the candidate track sections do not have other parallel track, executing the single track position comparison algorithm.

13. The satellite positioning system according to claim 8, wherein the one-dimensional train position MTLx further comprises a vertical track offset; and wherein the determining whether the MTLx is valid or not comprises:

determining whether an absolute value of the vertical track offset of MTLx is less than or equal to Threshold1, Threshold1 being a non-single track offset threshold, Threshold1>0:

in response to the absolute value of the vertical track offset of MTLx is less than or equal to Threshold1, MTLx is valid, and in response to the absolute value of the vertical track offset of MTLx is not less than or equal to Threshold1, MTLx is invalid.

14. A non-transitory machine-readable medium having instructions stored therein, which when executed by at least one processor, cause the at least one processor to perform operations, the operations including:

receiving satellite signals to obtain navigation data;

obtaining a track electronic map file;

based on the navigation data and the track electronic map file, selecting one or more track sections of a current position of the train as candidate track sections, and putting each of the candidate track sections into a set TrackList;

determining whether a number of the candidate track sections in the set TrackList is 1;

according to the determination result, selecting a single track position comparison algorithm or a non-single track position comparison algorithm to execute to determine an initial train position of the train; and controlling the train to operate according to the initial train position, wherein the non-single track position comparison algorithm comprises:

performing initialization, and taking out all the track sections of the TrackList and respectively denoting the track sections as T1, T2, . . . , Tn, a variable x=1;

obtaining current navigation data, performing a map matching algorithm on the current navigation data and each of the track sections T1, T2, . . . Tn, and according to the map matching result, generating a track-based one-dimensional train position MTLx comprising a station number, a track number and a parallel track offset;

determining whether the MTLx is valid or not;

determining whether {MTL1, . . . , MTLn} has only a unique valid value:

in response to {MTL1, . . . , MTLn} does not have only a unique valid value, exiting; and initializing the unique valid one-dimensional train position as the initial train position, such that the initial train position is determined successfully.

15. The non-transitory machine-readable medium according to claim 14, wherein the according to the determination result, selecting the single track position comparison algorithm or the non-single track position comparison algorithm comprises:

in response to the number of the candidate track sections in the set TrackList is greater than 1, executing the non-single track position comparison algorithm;

in response to the number of the candidate track sections in the set TrackList is equal to 1, determining, based on the track electronic map file, whether the candidate track sections have other parallel track sections;

in response to the candidate track sections have other parallel track sections, putting each of the parallel track sections into the set TrackList, and executing the non-single track position comparison algorithm; and in response to the candidate track sections do not have other parallel track, executing the single track position comparison algorithm.

16. The non-transitory machine-readable medium according to claim 14, wherein the one-dimensional train position MTLx further comprises a vertical track offset; and wherein the determining whether the MTLx is valid or not comprises:

determining whether an absolute value of the vertical track offset of MTLx is less than or equal to Threshold1, Threshold1 being a non-single track offset threshold, Threshold1>0:

in response to the absolute value of the vertical track offset of MTLx is less than or equal to Threshold1, MTLx is valid, and in response to the absolute value of the vertical track offset of MTLx is not less than or equal to Threshold1, MTLx is invalid.

* * * * *